No. 862,183. PATENTED AUG. 6, 1907.
W. MURPHY.
CLUTCH FOR TRANSMITTING ROTARY MOTION.
APPLICATION FILED MAR. 6, 1907.

4 SHEETS—SHEET 1.

No. 862,183. PATENTED AUG. 6, 1907.
W. MURPHY.
CLUTCH FOR TRANSMITTING ROTARY MOTION.
APPLICATION FILED MAR. 6, 1907.

4 SHEETS—SHEET 2.

No. 862,183. PATENTED AUG. 6, 1907.
W. MURPHY.
CLUTCH FOR TRANSMITTING ROTARY MOTION.
APPLICATION FILED MAR. 6, 1907.
4 SHEETS—SHEET 3.
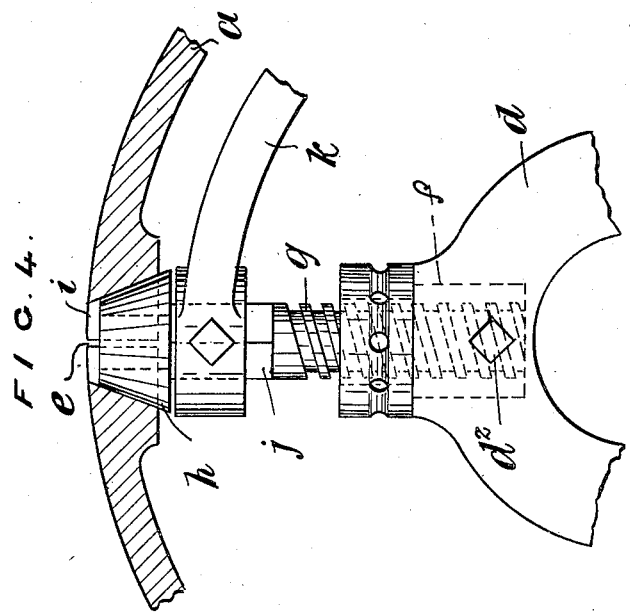
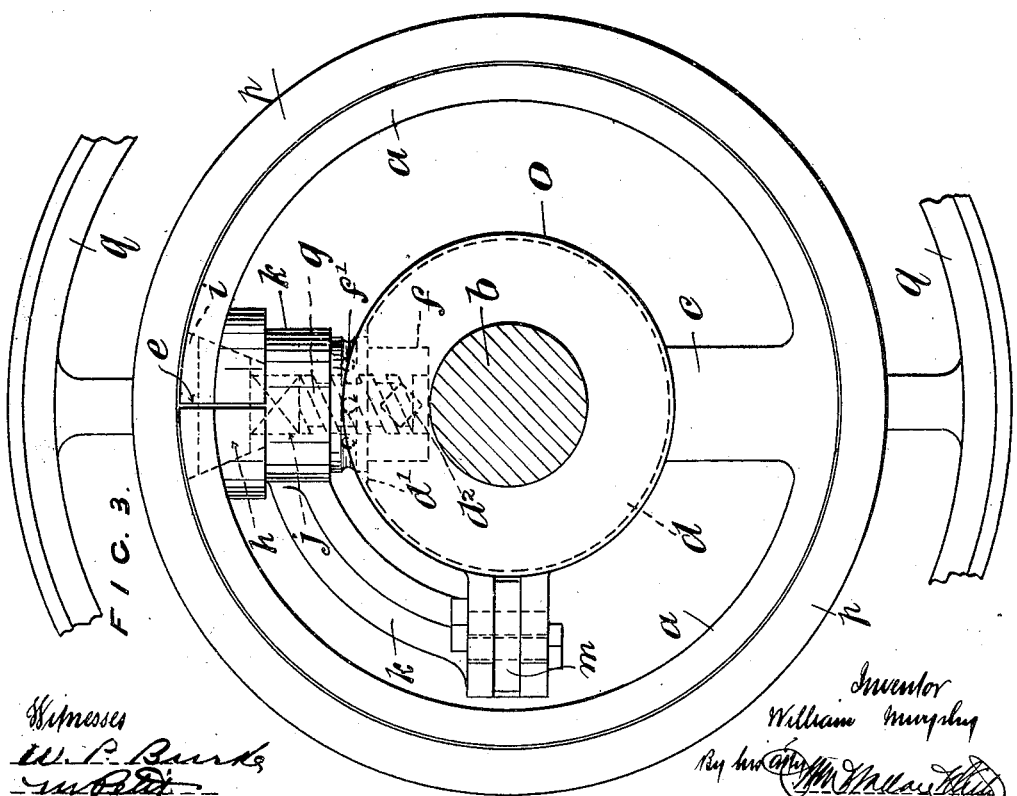

No. 862,183.
PATENTED AUG. 6, 1907.
W. MURPHY.
CLUTCH FOR TRANSMITTING ROTARY MOTION.
APPLICATION FILED MAR. 6, 1907.
4 SHEETS—SHEET 4.
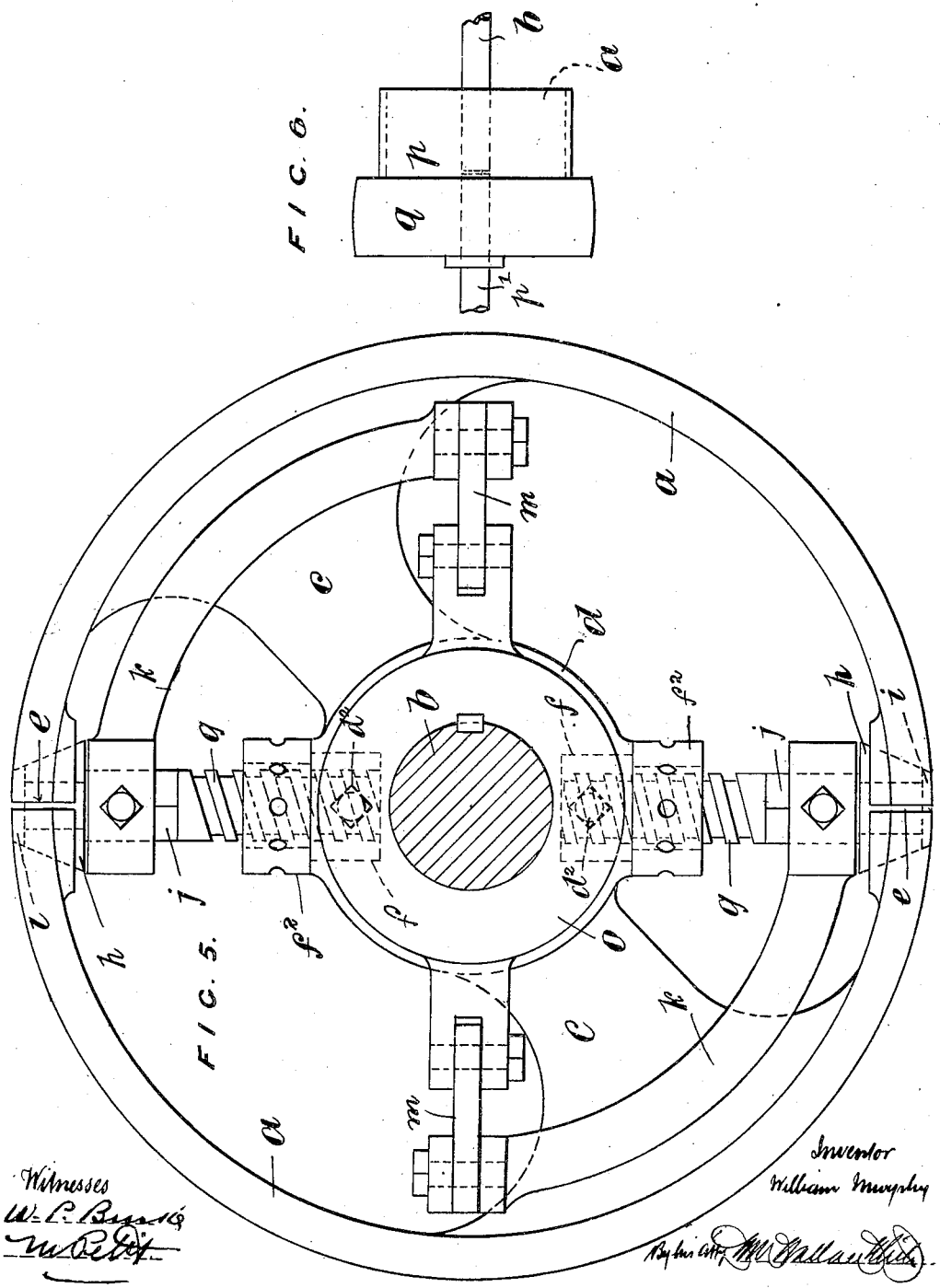

ID="UNITED STATES PATENT OFFICE.

WILLIAM MURPHY, OF MANCHESTER, ENGLAND, ASSIGNOR TO F. REDDAWAY AND COMPANY LIMITED, OF MANCHESTER, ENGLAND.

CLUTCH FOR TRANSMITTING ROTARY MOTION.

No. 862,183.

Specification of Letters Patent.

Patented Aug. 6, 1907.

Application filed March 6, 1907. Serial No. 360,935.

*To all whom it may concern:*

Be it known that I, WILLIAM MURPHY, a subject of Great Britain, residing at 150 Broughton road, Pendleton, Manchester, in the county of Lancaster, England, engineer, have invented new and useful Improvements in Clutches for Transmitting Rotary Motion, of which the following is a specification.

My invention relates to a clutch for transmitting rotary motion, and is particularly applicable in enabling me to construct very small clutches, although it can be equally applied to clutches of any desired size.

Figure 1:
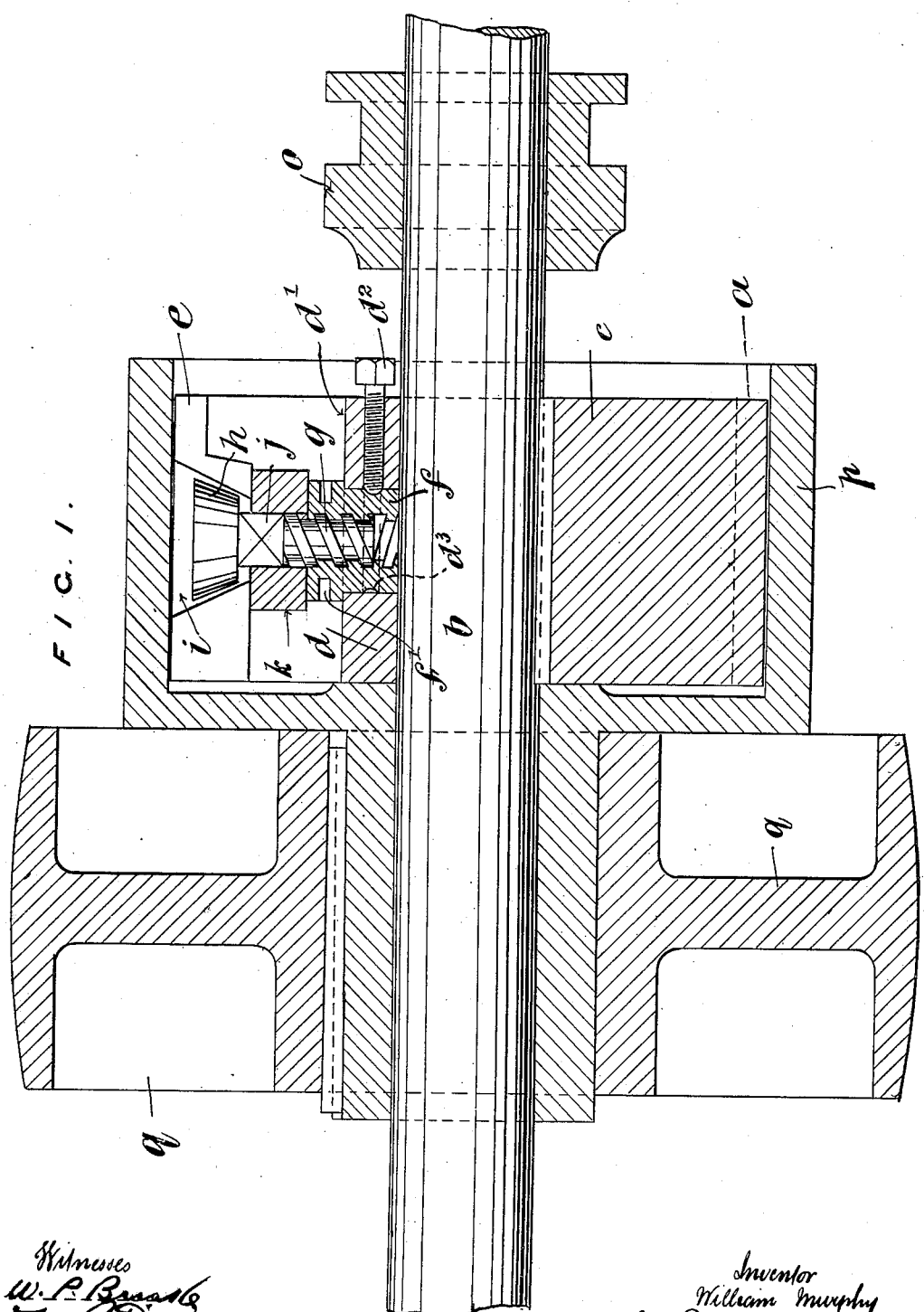
Figure 2:
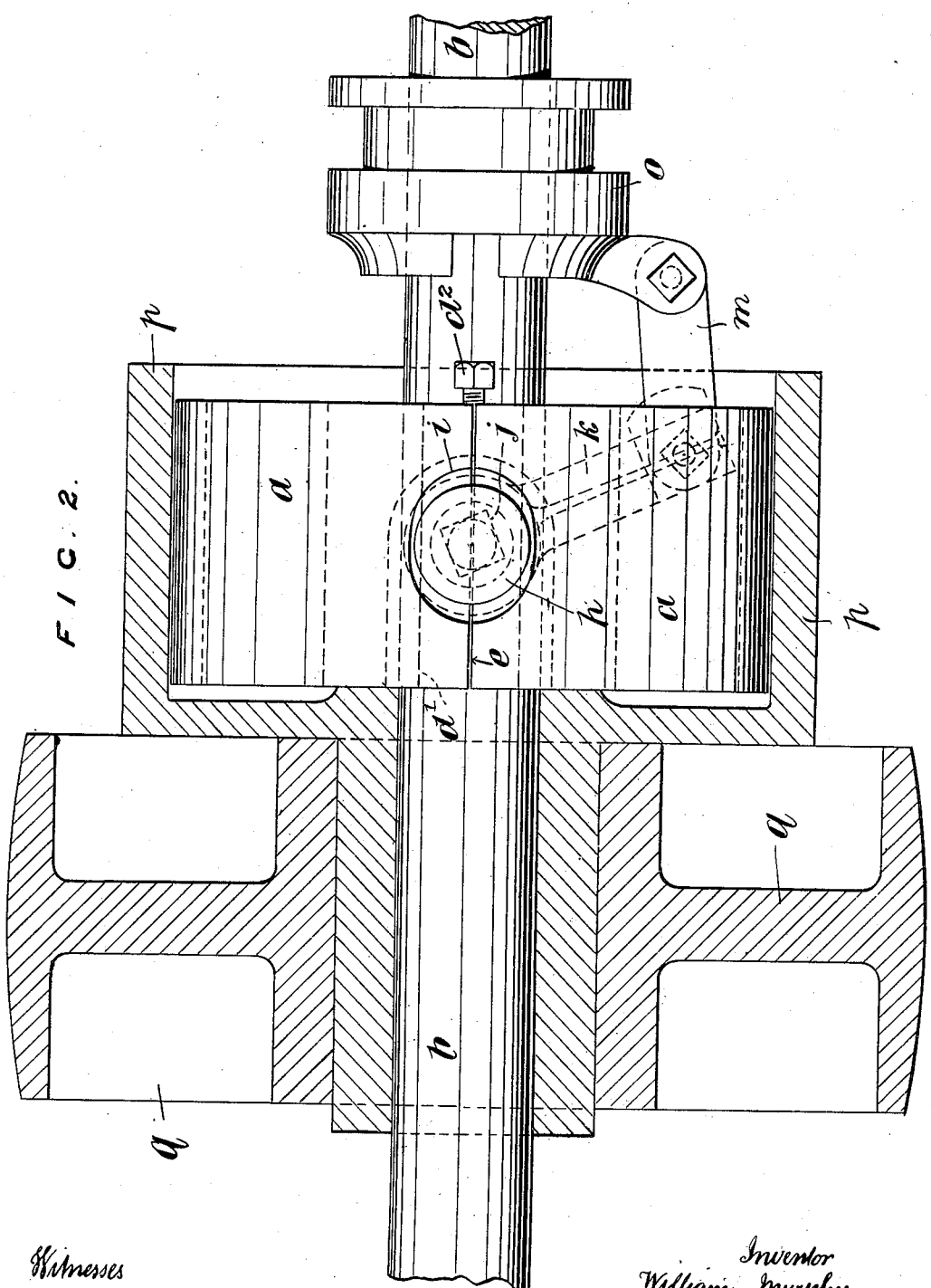

In the accompanying drawings Figure 1 shows in sectional front elevation a clutch made in accordance with my invention. Fig. 2 is a plan thereof partly in section. Fig. 3 is a side view. Fig. 4 shows a modification. Fig. 5 represents a larger type of clutch and Fig. 6 is a diagram showing how the clutch may be applied to abutting shafts.

In constructing a clutch under my invention and referring first to Figs. 1 to 3 I use an expansion ring $a$ keyed to the driving or driven shaft $b$ as the case may be. This expansion ring $a$ is of a type well known and consists of a ring $a$ of metal attached by an arm $c$ to a boss $d$ keyed on the shaft $b$, the ring being cut or split at a point $e$ diametrically opposite to the arm. Various modifications of such expansion ring exist and may be utilized under my invention. The boss $d$ of the expansion ring $a$ is flattened at $d'$ and bored out to receive a nut $f$ with which engages a screw $g$, the screw having a conical head $h$. At the point where the expansion ring $a$ is split at $e$ the periphery of such ring is bored with an elongated conical hole $i$, shown more clearly in the plan view Fig. 2, in which hole $i$ the conical head $h$ of the screw is recessed. To provide the necessary bearing surface for the head of the screw the metal of the expansion ring may be thickened at this point $e$ where the rim is split. Below the conical head on the screw is a squared part $j$ upon which is mounted the end of a lever $k$ the other end of the lever being connected by a link $m$ to a grooved sleeve $o$ slidable on the shaft. The expansion ring $a$ is inclosed in a shell $p$ loosely mounted on the shaft $b$ and a pulley $q$ is attached to or formed in one with the shell $p$. In some cases, as is shown in the diagram Fig. 6, the outer shell $p$ may be keyed to a shaft $p'$ in line with and abutting close up to the shaft $b$ carrying the expansion ring $a$, where motion from one such shaft is to be transmitted to the other.

To bring the clutch into action the sleeve $o$ is slid upon the shaft $a$ towards the clutch by any well known or convenient means, when the screw $g$ is rotated to some extent through the link $m$ and lever $k$ attached to the screw. This rotation withdraws the screw $g$ within the nut $f$ inwards towards the center of the shaft $a$, the conical head $h$ of the screw $g$ thus acting as a wedge to force apart the abutting portion of the split ring $a$, expanding the same in diameter and causing it to grip and be locked to the internal periphery of the outer shell $p$. The nut $f$ is secured to the boss $d$ of the expansion ring $a$ by a set screw $d^2$ passing through the boss and engaging with a groove $d^3$ in the nut $f$ or by other convenient means. Adjustment for wear is effected by slackening this set screw and rotating the nut $f$ and thereby actuating the screw $g$. This rotation can be effected by forming holes $f'$ in the head of the nut projecting out of the boss of the expansion ring and providing a pin to engage with such holes, or by other suitable means. I may, particularly with larger sizes of clutches, and as shown in Fig. 4, arrange for the screw $g$ to be forced outwards instead of being withdrawn inwards, the conical head $h$ of the screw $g$ and the recess $i$ in the expansion ring $a$ being correspondingly reversed so that the outward movement of the screw will act as a wedge to force apart the split portion of the expansion ring.

I may, particularly with large sized clutches, use an expansion ring with two splits in its periphery and in such a case the means described for expanding the ring would be duplicated. This arrangement is shown in Fig. 5. The expansion ring $a$ is split at two points $e$ $e$ the two arms or spokes $c$ $c$ connecting the ring $a$ to the boss $d$. The levers $k$ are mounted on the squares $j$ $j$ of the screws $g$ which engage with the recessed nuts $f$. A clearance is provided between the screws $g$, and the heads $f^2$ of the nuts for convenience in assembling the parts. When the sleeve $o$ is thrust inwards the levers $k$ through the links $m$ rotate the screws $g$ and thrust the conical heads $h$ therein outwards expanding the ring $a$ at two points as will be understood.

If the recess for the conical head of the screw were not elongated or of oval shape the clutch would be inoperative. As the screw is traversed the conical head thereof requires a larger diameter of hole to work in. This larger diameter is obtained in one direction by the expansion or opening out of the split portions of the expansion ring of the clutch. In the opposite direction it is obtained by making the hole oval. If it were not oval, but the metal bedded against the conical head the conical head could not move inwards (or outwards as the case might be), to effect the expansion of the inner half of the clutch, the conical head of the screw would be jammed. Before this expansion takes place the conical head of the screw is not in contact at all with the elongated sides of the hole as will be seen by inspecting the drawings. If the screw is traversed so far as to bring the conical head in contact with the elongated sides of the oval recess, the limit of expansion of the inner clutch split ring is reached.

I declare that what I claim is.

1. A clutch for transmitting rotary motion consisting of an expansion ring mounted on a shaft, a split formed in such ring an elongated or oval conical recess formed in the ring at such split, a nut rotatably carried by the boss of the expansion ring, means for normally holding said nut against movement a screw engaging with such nut, a conical head on the screw disposed in the conical recess in the expansion ring, and means for rotating and traversing the screw substantially as described.

2. A clutch for transmitting rotary motion consisting of an expansion ring mounted on a shaft, a split formed in such ring, an elongated or oval conical recess formed in the ring at such split, a nut rotatably carried by the boss of the expansion ring, means for normally holding said nut against movement a screw engaging with such nut, a conical head on the screw disposed in the conical recess in the expansion ring, a square formed on the screw, a lever mounted on such square, a slidable sleeve and a link connecting the lever with the sleeve substantially as described.

3. A clutch for transmitting rotary motion consisting of an expansion ring mounted on a shaft, a split formed in such ring, an elongated or oval conical recess formed in the ring at such split, a nut rotatably carried by the boss of the expansion ring, means for normally holding said nut against movement a screw engaging with such nut, a conical head on the screw disposed in the conical recess in the expansion ring, a square formed on the screw, a lever mounted on such square, a slidable sleeve and a link connecting the lever with the sleeve, an outer shell surrounding the expansion ring and a pulley attached to the outer shell substantially as described.

In testimony whereof I have signed my name to this specification in the presence of two subscribing witnesses.

WILLIAM MURPHY.

Witnesses:
JOSHUA ENTWISLE,
ALFRED YATES.